(12) United States Patent
Yamanaka et al.

(10) Patent No.: US 10,810,876 B2
(45) Date of Patent: Oct. 20, 2020

(54) ROAD OBSTACLE DETECTION DEVICE, METHOD, AND PROGRAM

(71) Applicant: TOYOTA JIDOSHA KABUSHIKI KAISHA, Toyota-shi, Aichi-ken (JP)

(72) Inventors: Masao Yamanaka, Tokyo (JP); Yasuyuki Kusumoto, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 15/964,748

(22) Filed: Apr. 27, 2018

(65) Prior Publication Data

US 2018/0330615 A1   Nov. 15, 2018

(30) Foreign Application Priority Data

May 12, 2017 (JP) ................................. 2017-095900

(51) Int. Cl.
*G08G 1/16* (2006.01)
*G06T 7/11* (2017.01)
(Continued)

(52) U.S. Cl.
CPC ........... *G08G 1/16* (2013.01); *G06K 9/00805* (2013.01); *G06K 9/3241* (2013.01); *G06T 7/11* (2017.01);
(Continued)

(58) Field of Classification Search
CPC ........ G08G 1/16; G06T 7/11; G06K 9/00805; G06K 9/3241
See application file for complete search history.

(56) References Cited

U.S. PATENT DOCUMENTS

2005/0209749 A1*  9/2005  Ito .............................. B60R 1/00
                                                                701/36
2010/0253594 A1* 10/2010  Szczerba ............... G01S 13/723
                                                                 345/7
(Continued)

FOREIGN PATENT DOCUMENTS

JP          2006-140636 A        6/2006

OTHER PUBLICATIONS

Son, T.T. (. "RoadnDetection Using Segmentation by Weighted Aggregation based on Visual Information and Posteriori Probability of Road Regions") IEEE International Conference on Systems, Man, and Cybernetics (Year: 2008).*
(Continued)

*Primary Examiner* — Kim Y Vu
*Assistant Examiner* — Molly Delaney
(74) *Attorney, Agent, or Firm* — Oliff PLC (57) ABSTRACT

Provided is a road obstacle detection method including: a region segmentation step of segmenting an input image into a plurality of local regions; and a likelihood calculation step of calculating a probability of presence of the road obstacle in a target local region based on a probability that the target local region is not a normal object set in advance and a degree of visual saliency defined by a relationship between a surrounding local region and the target local region, wherein the degree of visual saliency is calculated to be larger as a probability that the surrounding local region is a road is higher and calculated to be larger as a difference in visual characteristics between the target local region and the surrounding local region is larger.

21 Claims, 10 Drawing Sheets

(51) Int. Cl.
*G06K 9/00* (2006.01)
*G06K 9/32* (2006.01)
*G06K 9/62* (2006.01)
*G06K 9/72* (2006.01)

(52) U.S. Cl.
CPC ......... *G08G 1/165* (2013.01); *G06K 9/00798* (2013.01); *G06K 9/6277* (2013.01); *G06K 9/72* (2013.01)

(56) References Cited

U.S. PATENT DOCUMENTS

| | | | |
|---|---|---|---|
| 2014/0193074 A1* | 7/2014 | Huang | G06K 9/4642 382/180 |
| 2016/0086050 A1* | 3/2016 | Piekniewski | G06K 9/4671 382/103 |
| 2016/0358035 A1* | 12/2016 | Ruan | G06K 9/4676 |
| 2017/0206426 A1* | 7/2017 | Schrier | B60W 50/00 |
| 2018/0307935 A1* | 10/2018 | Rao | G06K 9/4671 |

OTHER PUBLICATIONS

Ozaki et al., "Vehicle detection by Two-Stage AdaBoost with Joint HOG Feature Amount," IEICE Academic Journal, 2009.
Achanta et al., "SLIC Superpixels Compared to State-of-the-Art Superpixels Methods," IEEE TPAMI, 2012, vol. 34, No. 11, pp. 2274-2281.
Vedaldi et al., "Quick shift and kernal methods for mode seeking," ECCV,2008.
Levinshtein et al., "TurboPixels: Fast Superpixels Using Geometric Flows," IEEE TPAMI, 2009, vol. 31, No. 12, pp. 2290-2297.
Krahenbuhl et al., "Efficent Inference in Fully Connected CRFs with Gaussian Edge Potentials," NIPS, 2010.
Long et al., "Fully Convolutional Networks for Semantic Segmentation," CVPR, 2015.
Zheng et al., "Conditional Random Fields as Recurrent Neural Netwoks," ICCV, 2015.
Otsu, "A Threshold Selection Methods from Gray-Level Histograms," IEEE Transactions on Systems, Man, and Cybernetics, vol. SMC-9, No. 1, pp. 62-66, 1979.

* cited by examiner

ROAD OBSTACLE DETECTION DEVICE, METHOD, AND PROGRAM

BACKGROUND OF THE INVENTION

Field of the Invention

The present invention relates to a technology for detecting road obstacles in images.

Description of the Related Art

Road obstacles are abnormal objects present on roads and are objects that disturb ordinary vehicle traveling. As methods for detecting road obstacles, active methods using millimeter wave radars and passive methods using cameras (such as visible light cameras and infrared cameras) have been known.

The present disclosure will discuss a machine learning method using an image taken by a visible light camera as an input. According to NPL 1, it is possible to learn a discriminator through machine learning using image information on road obstacles as an input and detect the road obstacles using the acquired discriminator. In NPL 1, a Joint HOG feature amount in which a plurality of histograms of oriented gradients (HOG) are combined together in an image is calculated, and a feature amount effective for discriminating vehicles is selected by AdaBoost.

According to NPL 1, discrimination targets learned in advance are detectable. Therefore, road obstacles may be detected in such a way as to collect learning data on the road obstacles and perform learning processing. However, it is actually impossible to learn all the road obstacles since the road obstacles are varied.

It has been requested to detect road obstacles without directly learning the road obstacles themselves.

CITATION LIST

Patent Literature

PTL 1: Japanese Patent Application Laid-open No. 2006-140636

Non Patent Literature

NPL 1: Vehicle detection by Two-Stage AdaBoost with Joint HOG Feature Amount, 2009, IEICE Academic Journal, Ozaki, Fujiyoshi, et al. (Chubu University)
NPL 2: R. Achanta, A. Shaji, K. Smith, A. Lucchi, P. Fua, and S. Susstrunk, Slic superpixels compared to state-of-the-art superpixel methods. TPAMI, 2012.
NPL 3: A. Vedaldi, S. Soatto, Quick shift and kernel methods for mode seeking. ECCV, 2008
NPL 4: A. Levinshtein, A. Stere, K. Kutulakos, D. Fleet, S. Dickinson, K. Siddiqi, Turbopixels: Fast superpixels using geometric flows. PAMI, 2009
NPL 5: Efficient Inference in Fully Connected CRFs with Gaussian Edge Potentials, NIPS2010, Philipp Krahenbuhl and Vladlen Koltun (Stanford Univ.)
NPL 6: Fully Convolutional Networks for Semantic Segmentation (FCN), CVPR2015, Jonathan Long and Evan Shelhamer (UC Berkeley Univ.)
NPL 7: Conditional Random Fields as Recurrent Neural Networks (CRFasRNN), ICCV2015, Shuai Zheng and Sadeep Jayasumana (Oxford Univ.)
NPL 8: Nobuyuki Otsu, A Threshold Selection Method from Gray-Level Histograms, IEEE Transactions on Systems, Man, and Cybernetics, Vol. SMC-9, No. 1, pp. 62-66, January 1979.

SUMMARY OF THE INVENTION

The present invention has been made in consideration of the above problems and has an object of accurately detecting road obstacles without learning the obstacles.

A first mode of the present invention provides a road obstacle detection device that detects a road obstacle in an image, the road obstacle detection device including:
an image input unit configured to receive an input of an image;
a region segmentation unit configured to segment the image into a plurality of local regions; and
a likelihood calculation unit configured to calculate a probability of presence of the road obstacle in a target local region based on a probability that the target local region is not a normal object set in advance and a degree of visual saliency defined by a relationship between a surrounding local region and the target local region, wherein the degree of the visual saliency is calculated to be larger as a probability that the surrounding local region is a road is higher and calculated to be larger as a difference in visual characteristics between the target local region and the surrounding local region is larger.

The region segmentation unit performs segmentation processing so that each of local regions is a continuous region and feature amounts at respective points inside the local regions are similar to each other. As feature amounts, colors, brightness, edge strength, texture, or the like may be used. Local regions may also be expressed as regions that do not cross the boundary between a foreground and a background.

A probability that a target local region corresponds to a road obstacle is determined according to a probability that the target local region is not a normal object and the degree of visual saliency acquired from a surrounding local region. Here, the degree of the visual saliency is calculated to be larger as a probability that the surrounding local region is a road is higher and calculated to be larger as the degree of the visual difference between the surrounding local region and the target local region is larger. That is, a probability that a target local region corresponds to a road obstacle is determined from a viewpoint that the target local region itself is an unknown object and a viewpoint that a road and appearance are different.

A normal object represents an object not defined as an obstacle among objects present on roads or their surrounding objects. A probability that a target local region is not a normal object may be calculated as follows. That is, the road obstacle detection device may have a discrimination unit configured to be capable of discriminating a plurality of normal objects set in advance and calculate a probability that a target local region is not a normal object based on a discrimination result by the discrimination unit. For example, the discrimination unit may calculate a probability that each of pixels corresponds to each of a plurality of normal objects set in advance and calculate probabilities that the pixels do not correspond to the normal objects based on the sum of the probabilities. A probability that a local region is not a normal object may be calculated as the average of probabilities that respective pixels in the local region do not correspond to the normal object. Note that the discrimination unit may be capable of discriminating a specific road obstacle. In this case, a probability that a local region is the specific road obstacle may be included in a probability that the local region is not a normal object.

The present invention is capable of detecting road obstacles without learning the road obstacles but does not exclude the learning of the road obstacles in advance.

A probability that a surrounding local region is a road may be calculated based on a discrimination result by the discrimination unit capable of discriminating the "road". Here, the discrimination unit may be capable of discriminating a "road" or may be capable of discriminating an object belonging to the subordinate concept of the "road" such as a "paved road", an "unpaved road", and a "white line". In the latter case, a probability that a local region is a "road" may be a probability (the sum of respective probabilities) that the local region is any object of the subordinate concept of the "road". In addition, the discrimination unit may calculate a probability that a local region is a "road" for each pixel. In this case, a "probability that a local region is a 'road'" may be calculated as the average of probabilities that respective pixels in the local region correspond to the "road".

A difference in the visual characteristics (the degree of the visual difference) between a target local region and a surrounding local region may be evaluated according to the degree of a difference (distance) in appearance. The evaluation of appearance may be performed based on colors, brightness, edge strength, texture, or the like. When the degree of a visual difference is evaluated using the degree of a difference in color characteristics, the distance (Euclidean distance or other distance measurements) between the average of color characteristics in a target local region and the average of color characteristics in a local surrounding region may be used as the degree of the visual difference.

Further, the degree of the visual saliency may be calculated to be larger as a size of the surrounding local region is larger. This is because it appears that a larger surrounding local region exerts greater influence. A size may be evaluated based on the number of pixels in a region but may be evaluated based on other scales such as a peripheral length and the size of a circumscribing rectangle.

Further, the degree of the visual saliency may be calculated to be larger as a distance between the target local region and the surrounding local region is smaller. This is because it appears that a closer surrounding local region exerts greater influence. The distance between local regions may be defined in any way but may be defined using, for example, the distance between gravity centers.

The probability that the target local region is the road obstacle is preferably calculated as a product of a sum of the degrees of the visual saliency of all the surrounding local regions and the probability that the target local region is not the normal object.

Further, the region segmentation unit may segment the image with a plurality of different particle sizes, and the likelihood calculation unit may calculate the probability of the presence of the road obstacle in the target local region by the above method for each of segmentation results with the respective particle sizes. The road obstacle detection device may further include an integration unit configured to integrate the respective probabilities together to determine the probability of the presence of the road obstacle for each pixel. The region segmentation is preferably performed according to the size of a road obstacle, but the size of the road obstacle is not understood in advance. In view of this, an image is segmented with a plurality of particle sizes to calculate likelihoods, and the results are integrated together. Thus, it becomes possible to accurately detect a road obstacle regardless of the size of the road obstacle.

The road obstacle detection device according to the mode may further include: a detection unit configured to subject threshold processing to the probability of the presence of the road obstacle, and detect a region in the image in which the road obstacle is present based on a result of the threshold processing. Alternatively, the road obstacle detection device according to the mode may output a likelihood before subjecting the threshold processing as a final result.

A second mode of the present invention provides a road obstacle detection device that detects a road obstacle in an image, the road obstacle detection device including:

an image input unit configured to receive an input of an image;

a region segmentation unit configured to segment the image into a plurality of local regions $S_n (n=1, \ldots, N)$;

a semantic label estimation unit configured to estimate semantic labels of the plurality of local regions; and a likelihood calculation unit configured to calculate a probability $L_i$ of presence of the road obstacle in a target local region $S_i$ based on an equation below $$L_i = \sum_{j=1}^{N} \{n(S_j) \cdot d_{appear}(S_i, S_j) \cdot P_{road}(S_j) \cdot W(d_{position}(S_i, S_j))\} \cdot P_{others}(S_i) \qquad [\text{Math. 1}]$$

wherein $n(S_j)$ represents a size of a local region $S_j$, $d_{appear}(S_i, S_j)$ represents a degree of a visual difference between the local region $S_i$ and the local region $S_j$, $P_{road}(S_j)$ represents a probability that the local region $S_j$ is a road, $d_{position}(S_i, S_j)$ represents a distance between the local region $S_i$ and the local region $S_j$, $W(d_{position}(S_i, S_j))$ represents a function in which a value becomes smaller as $d_{position}(S_i, S_j)$ is larger, and $P_{others}(S_i)$ represents a likelihood that the local region $S_i$ is not a normal object.

Note that the present invention may be grasped as a road obstacle detection device including at least a part of the above units. Further, the present invention may be grasped as a road obstacle detection method that executes at least a part of the above processing. Further, the present invention may be grasped as a computer program for causing a computer to execute the method or may be grasped as a non-transitory computer-readable storage medium storing the computer program. Each of the above units and the processing may be combined together to a greater extent to constitute the present invention.

According to the present invention, it becomes possible to accurately detect road obstacles without learning the road obstacles in advance.

DESCRIPTION OF THE EMBODIMENTS

First Embodiment

A first embodiment of the present invention relates to a road obstacle detection device that detects road obstacles based on an image (one still image) taken by a camera mounted on a vehicle. The road obstacle detection device according to the embodiment adopts a method not relying on the learning of obstacles and thus is capable of accurately detecting even unknown obstacles.

Hereinafter, a description will be given, with reference to FIGS. 1 to 7, of the road obstacle detection device according to the embodiment.

Figure 1:
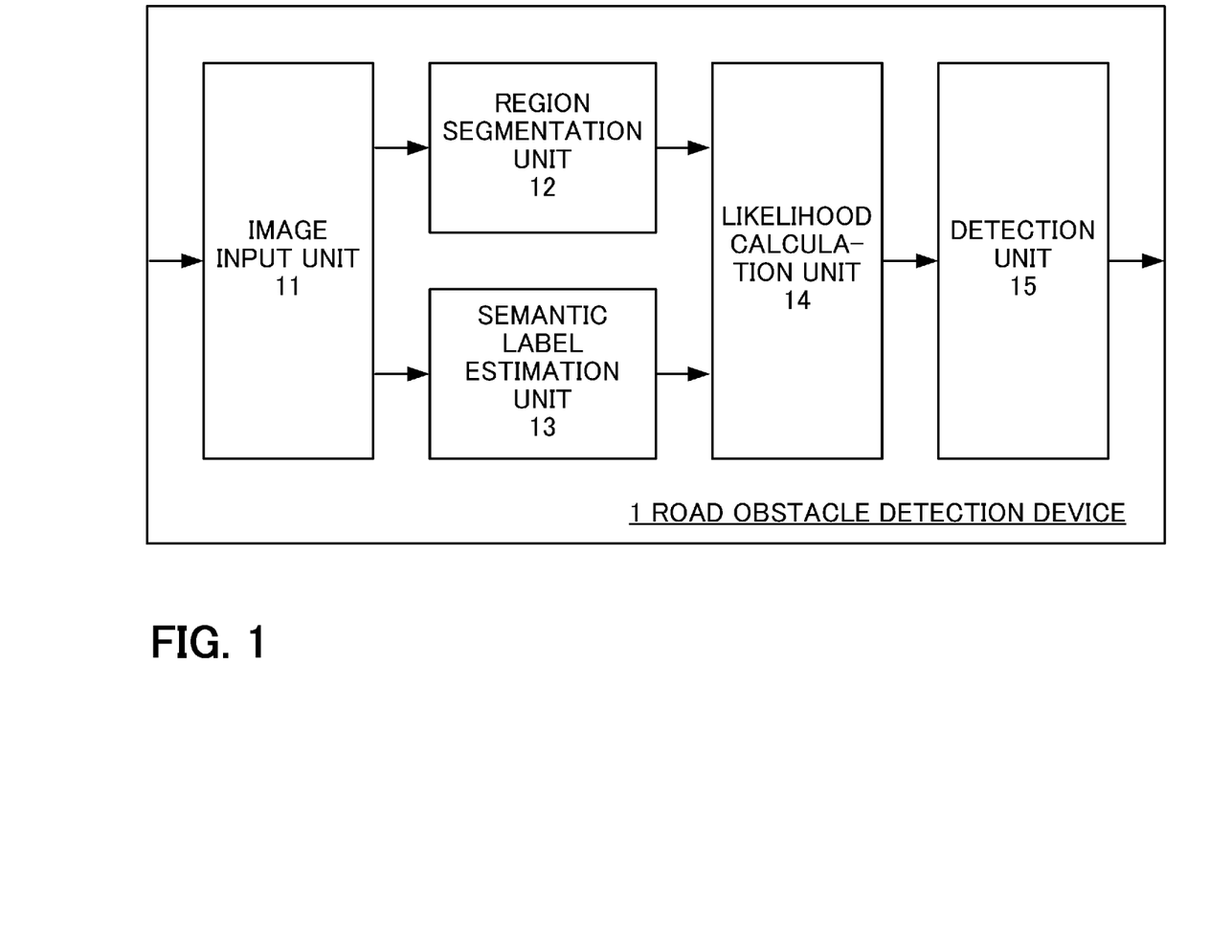
FIG. 1 is a function configuration diagram of a road obstacle detection device according to a first embodiment.

FIG. 1 is a block diagram showing the schematic configuration of a road obstacle detection device 1 according to the embodiment. The road obstacle detection device 1 according to the embodiment may be realized by a semiconductor integrated circuit (LSI). Here, as shown in FIG. 1, the road obstacle detection device 1 has an image input unit 11, a region segmentation unit 12, a semantic label estimation unit 13, a likelihood calculation unit 14, and a detection unit 15. Each of these constituents corresponds to functions carried out by the road obstacle detection device 1.

The image input unit 11 acquires an image input from the outside of the road obstacle detection device 1 and outputs an image I(t) at time t to the region segmentation unit 12 and the semantic label estimation unit 13. A method for acquiring the image with the image input unit 11 is not particularly limited. The image may be directly acquired from a camera or may be acquired through communication.

Figure 2:
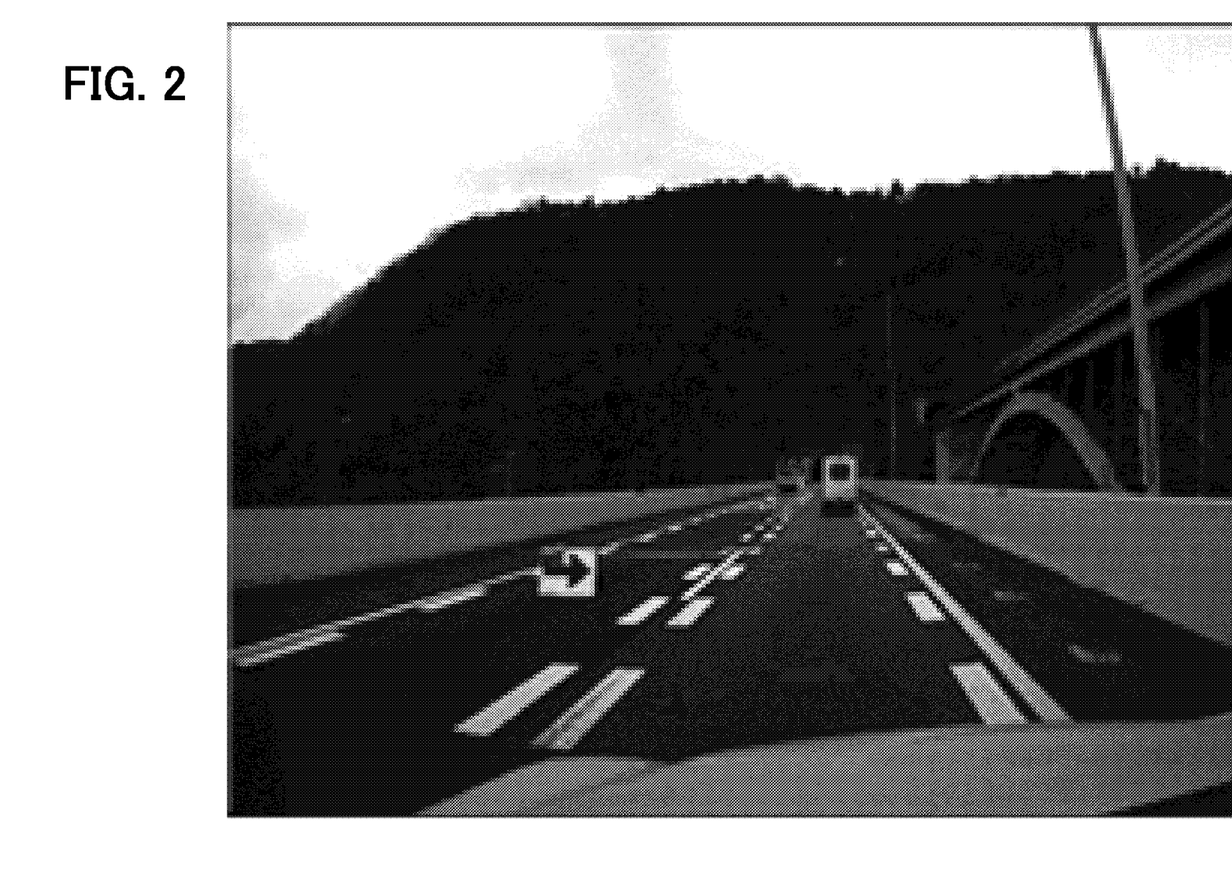
FIG. 2 is a diagram showing an example of an input image.

An example of the image input to the image input unit 11 is shown in FIG. 2. The size of the image is not particularly limited. In addition, the image is preferably a color image in terms of its detection accuracy but may be a monochrome image.

Figure 3:
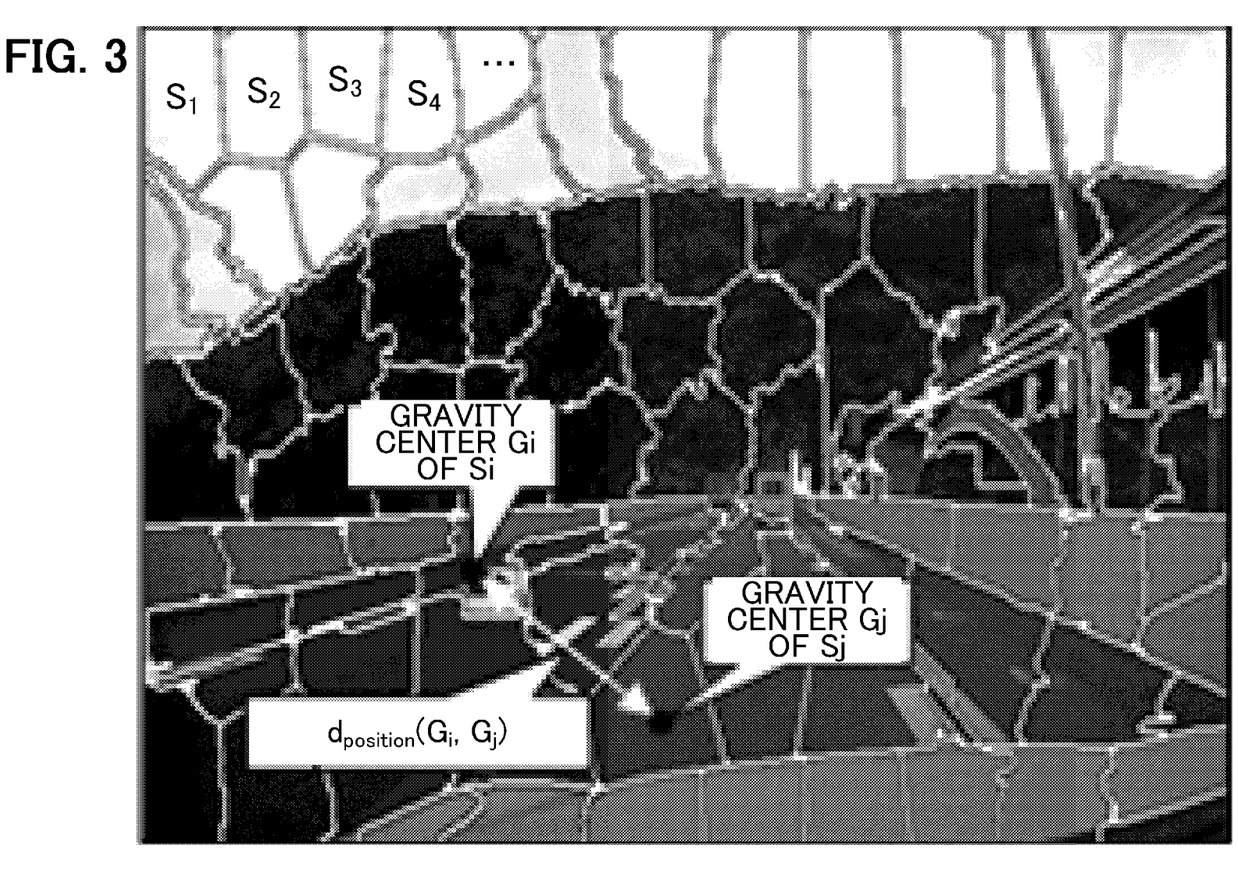
FIG. 3 is a diagram for describing a result of region segmentation and the distance between local regions.

As shown in FIG. 3, the region segmentation unit 12 segments the image I(t) into N local regions $S_n(n=1, \ldots, N)$. This segmentation processing is also called superpixel processing. Each of the local regions is a continuous region, and feature amounts at respective points inside the local regions are similar to each other. As the feature amounts, colors, brightness, edge strength, texture, or the like may be used. The local regions may also be expressed as regions that do not cross the boundary between a foreground and a background. As a region segmentation algorithm, any of the algorithms described in NPL 2 to NPL 4 may be used. The region segmentation unit 12 outputs the N segmented local regions $S_n$ to the likelihood calculation unit 14.

The semantic label estimation unit 13 estimates a semantic label for each of the pixels p(x,y) of the image I(t). The semantic label estimation unit 13 learns a discriminator to discriminate a plurality of (M) types of objects in advance, calculates a probability $P_m(m=1, \ldots, M)$ that each of the pixels p(x,y) belongs to each of M semantic labels $L_m$ (m=1, \ldots, M), and outputs the calculated probabilities to the likelihood calculation unit 14.

Objects learned by the semantic label estimation unit 13 are skies, roads (such as paved roads and white lines), vehicles (such as passenger vehicles, trucks, and motorcycles), natures (such as mountains, forests, and street trees), and artificial structures (such as street lamps, iron poles, and guardrails). The semantic label estimation unit 13 may learn only normal objects (objects other than obstacles) as targets and may not learn the obstacles as targets. Of course, the semantic label estimation unit 13 may learn representative obstacles as targets. In addition, objects having unknown ground truth are assigned an "unknown label" ("other" label) when learning data is prepared. In this sense, the semantic label estimation unit 13 also learns unknown objects (obstacles) as targets.

The estimation of the semantic labels may be realized by any existing algorithm. For example, a method based on a conditional random field (CRF) as in NPL 5, a method based on deep learning (particularly, convolutional neural network (CNN)) as in NPL 6, a method in which these methods are combined together as in NPL 7, or the like is adoptable.

Figure 4:
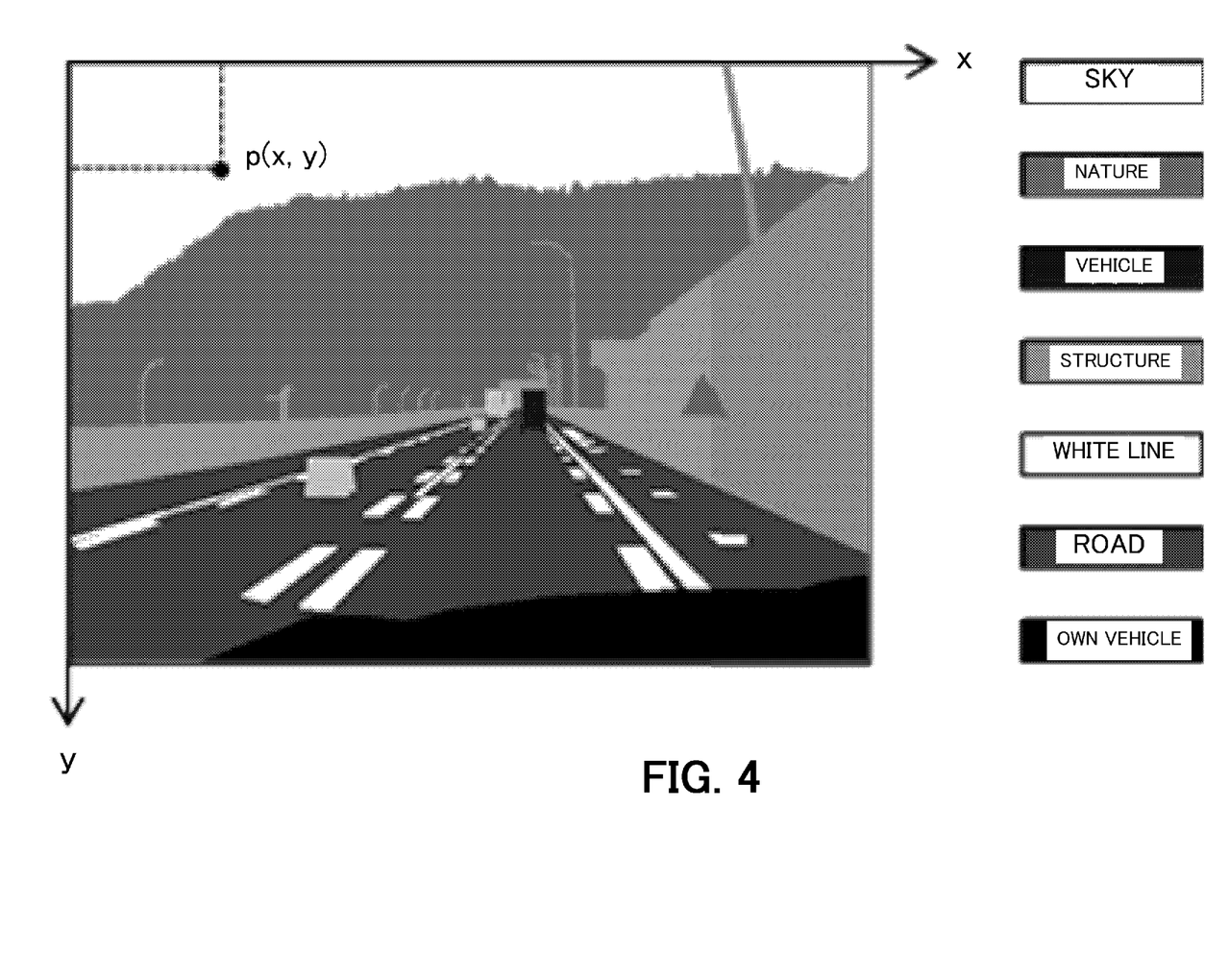
FIG. 4 is a diagram for describing a result of estimating semantic labels.

FIG. 4 shows a processing result by the semantic label estimation unit 13. As described above, a probability is calculated for each of the pixels p(x,y) and each of the semantic labels $L_m$. However, in FIG. 4, the semantic label of the highest probability is shown for each of the pixels.

Figure 5:
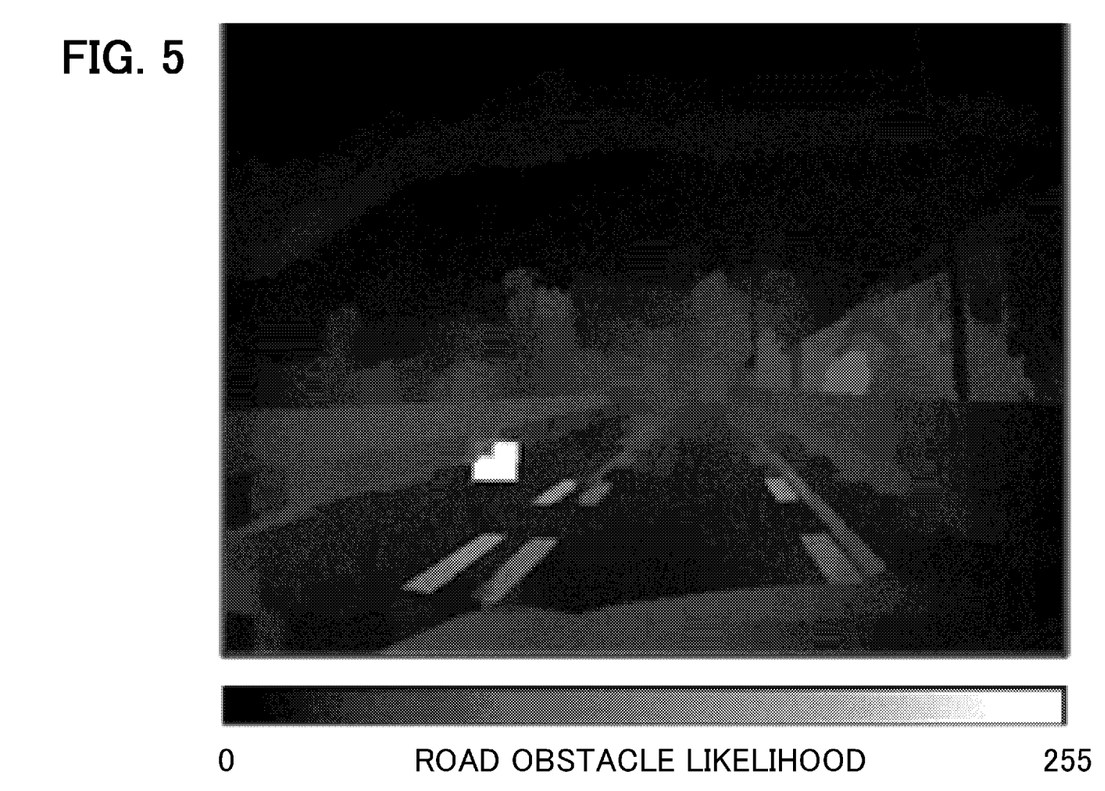
FIG. 5 is a diagram showing a result of calculating a road obstacle likelihood.

As shown in FIG. 5, the likelihood calculation unit 14 calculates a road obstacle likelihood $L_i$ in the i(=1, \ldots, N)-th local region $S_i$ of the image I(t) based on the local regions $S_n(n=1, \ldots, N)$ obtained by the region segmentation unit 12 and the probabilities $P_m(m=1, \ldots, M)$ obtained by the semantic label estimation unit 13, and outputs the calculated road obstacle likelihood $L_i$ to the detection unit 15. Specifically, the road obstacle likelihood $L_i$ may be defined by equation 1 below.

$$L_i = \sum_{j=1}^{N} \{n(S_j) \cdot d_{appear}(S_i, S_j) \cdot P_{road}(S_j) \cdot W(d_{position}(S_i, S_j))\} \cdot P_{others}(S_i) \quad \text{(eq. 1)}$$

Here, each of terms in equation 1 has the following meaning.

$n(S_j)$ represents the size of the $j(=1, \ldots, N)$-th local region $S_j$. For example, the number of pixels in the local region $S_j$ may be adopted as $n(S_j)$.

$d_{appear}(S_i, S_j)$ represents the degree of visual difference, i.e., the degree of a difference in appearance (distance) between the i-th local region $S_i$ and the j-th local region $S_j$. The evaluation of appearance may be performed based on colors, brightness, edge strength, texture, or the like. When the degree of a visual difference is evaluated using the degree of a difference in color characteristics, $d_{appear}(S_i, S_j)$ may be calculated as the Euclidean distance between the average $(H_i, S_i, V_i)$ of color characteristics in the local region $S_i$ and the average $(H_j, S_j, V_j)$ of color characteristics in the local region $S_j$. The same applies to a case in which appearance characteristics other than colors are used. In addition, the degree of a visual difference may be evaluated with comprehensive consideration given to a plurality of appearance characteristics.

$P_{road}(S_j)$ represents a probability that the semantic label of the j-th local region $S_j$ is a "road". Note that when a "road" is constituted of a "paved road" and a "white line", a probability that a semantic label is a "road" represents a probability that the semantic label is the "paved road" or the "white line". In addition, since the probability of a semantic label is calculated for each pixel as described above, $P_{road}(S_j)$ may be calculated as the average of probabilities that the semantic labels of respective pixels in the local region $S_j$ correspond to a "road".

$d_{position}(S_i, S_j)$ represents the distance between the local region $S_i$ and the local region $S_j$. The distance between local regions may be defined by, for example, the distance between gravity centers. That is, $d_{position}(S_i, S_j)$ may be calculated as the Euclidean distance (see FIG. 3) between a gravity center position $G_i$ of the local region $S_i$ and a gravity center position $G_j$ of the local region $S_j$. In terms of this point, $d_{position}(S_i, S_j)$ may also be represented as $d_{position}(G_i, G_j)$.

$W(d_{position}(G_i, G_j))$ is a function representing a weight corresponding to the distance $d_{position}$ between the gravity centers of the local regions $S_i$ and $S_j$. Here, the function W may take any form so long as the value of the function W is defined to be smaller as the distance $d_{position}$ between the gravity centers is larger. For example, the following Gaussian weight function may be adopted. Note that $w_0$ represents the median of the gravity center distances between the pairs of all the local regions.

$$W(d_{position}(G_i, G_j)) = \exp\left(-\frac{d_{position}(G_i, G_j)^2}{2 \cdot w_0^2}\right) \quad \text{(eq. 2)}$$

$P_{others}(S_i)$ is a probability that the semantic label of the local region $S_i$ is an object other than a normal object. When an obstacle is learned as a non-learning target, a state in which "a semantic label is an object other than a normal object" is equivalent to a state in which "the semantic label is "other" object". When an obstacle is learned as a learning target, a state in which "a semantic label is an object other than a normal object" is equivalent to a state in which "the semantic label is an "obstacle" or "other object"". Note that since the probability of a semantic label is calculated for each pixel, $P_{others}$ may be calculated as the average of the probabilities of respective pixels in the local region $S_i$ like $P_{road}$.

In the above equation 1, summation is performed in the range of j=1 to j=N. However, $d_{appear}(S_i, S_j)=0$ is established when j=i. Therefore, j=i may be eliminated. In addition, j having a weight W substantially close to zero may not be included as a target.

FIG. 5 shows an example of the result of calculating the obstacle likelihood $L_i$ by the likelihood calculation unit 14.

Figure 6:
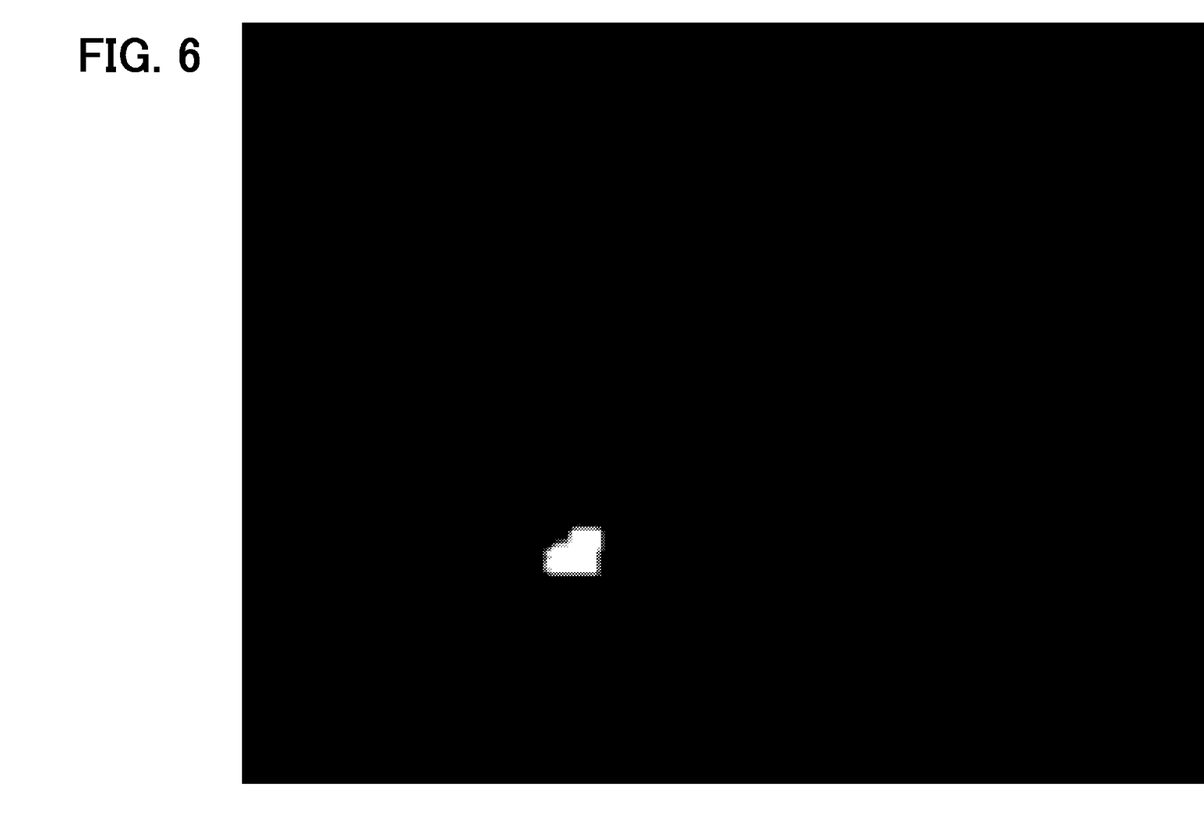
FIG. 6 is a diagram showing a result of subjecting threshold processing to the road obstacle likelihood.
Figure 7:
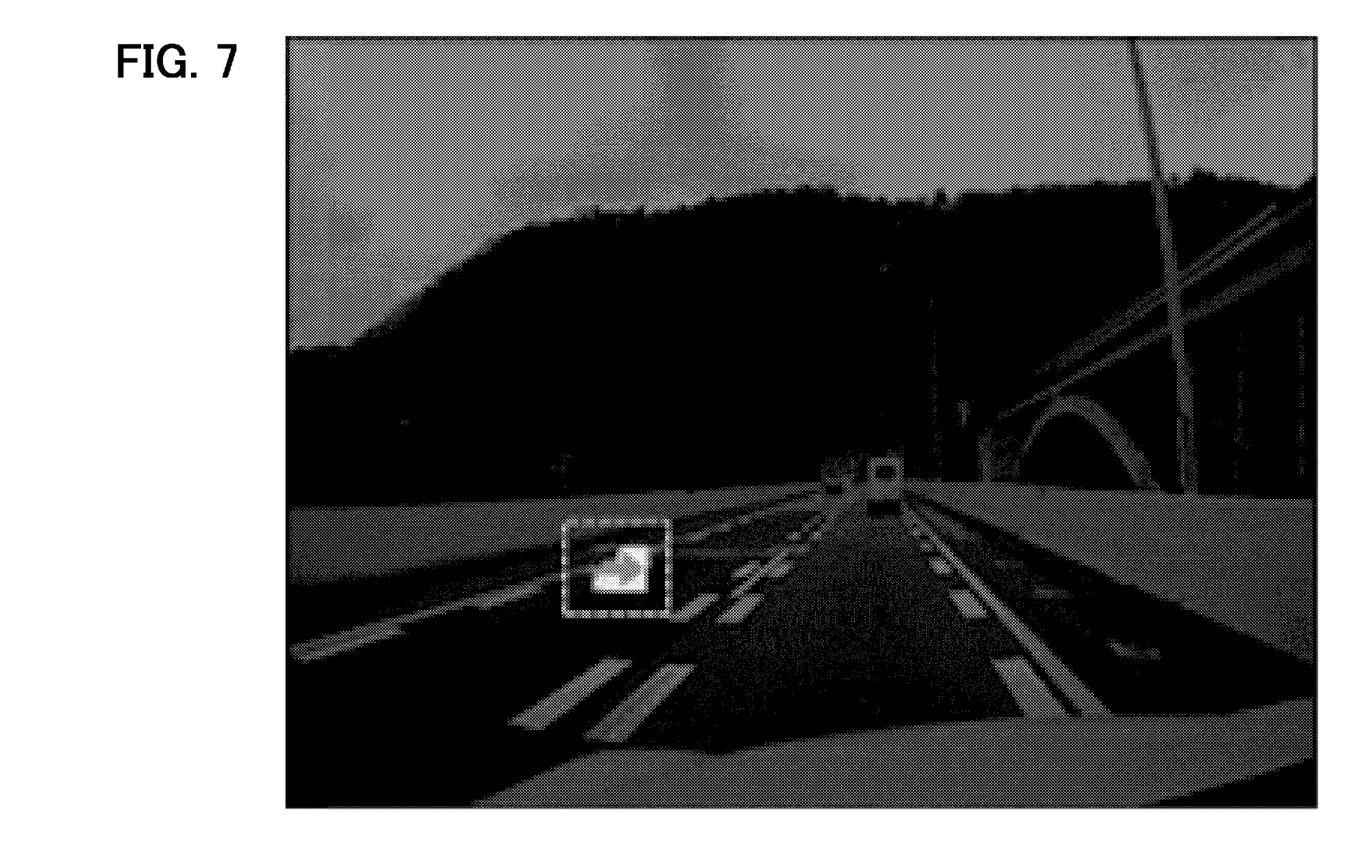
FIG. 7 is a diagram showing a result of detecting the road obstacle.

As shown in FIG. 6, the detection unit 15 detects a road obstacle in the image I(t) based on the obstacle likelihood $L_i$(i=1, . . . ,N) obtained by the likelihood calculation unit 14. Specifically, the detection unit 15 separates the respective pixels in the image I(t) into a road-obstacle candidate region (white region in FIG. 6) and the other region (black region in FIG. 6) by binarization processing. The threshold of the binarization processing may be a value set in advance. Alternatively, it is also preferable to adaptively determine such a threshold as to minimize in-class variance and maximize interclass variance (see NPL 8). In addition, as shown in FIG. 7, the detection unit 15 sets a rectangular region circumscribing the candidate region of an obtained noticeable region to finally detect the road obstacle in the image I(t).

The road obstacle detection result thus obtained may be used in any way. For example, the detection result may be informed to the driving assist system of a vehicle on which the road obstacle detection device 1 is mounted to alert a driver or execute avoid control or assistance. Alternatively, the detection result may be transmitted to a rear vehicle through direction communication between the vehicles or communication via a cloud. Further, when the road obstacle detection device 1 is mounted on a roadside machine, the detection result may be transmitted to surrounding vehicles from the roadside machine. Further, as shown in FIG. 7, a display (dotted rectangle in the example of FIG. 7) to highlight the detected road obstacle may be displayed on a display unit so as to be superimposed on the input image. A method for highlighting the detected road obstacle is not limited to using the dotted rectangle, but various methods such as using other marks like circles, arrows, or the like and changing colors or chroma may be adopted.

According to the embodiment, road obstacles may be accurately detected from an image without being separately learned in advance. In an approach in which road obstacles are learned in advance, the detection of unlearned obstacles is not allowed. However, the present method has no need to learn road obstacles in advance and thus makes it possible to detect any road obstacle.

Second Embodiment

A description will be given, with reference to FIGS. 8 to 10, of a second embodiment of the present invention.

Figure 8:
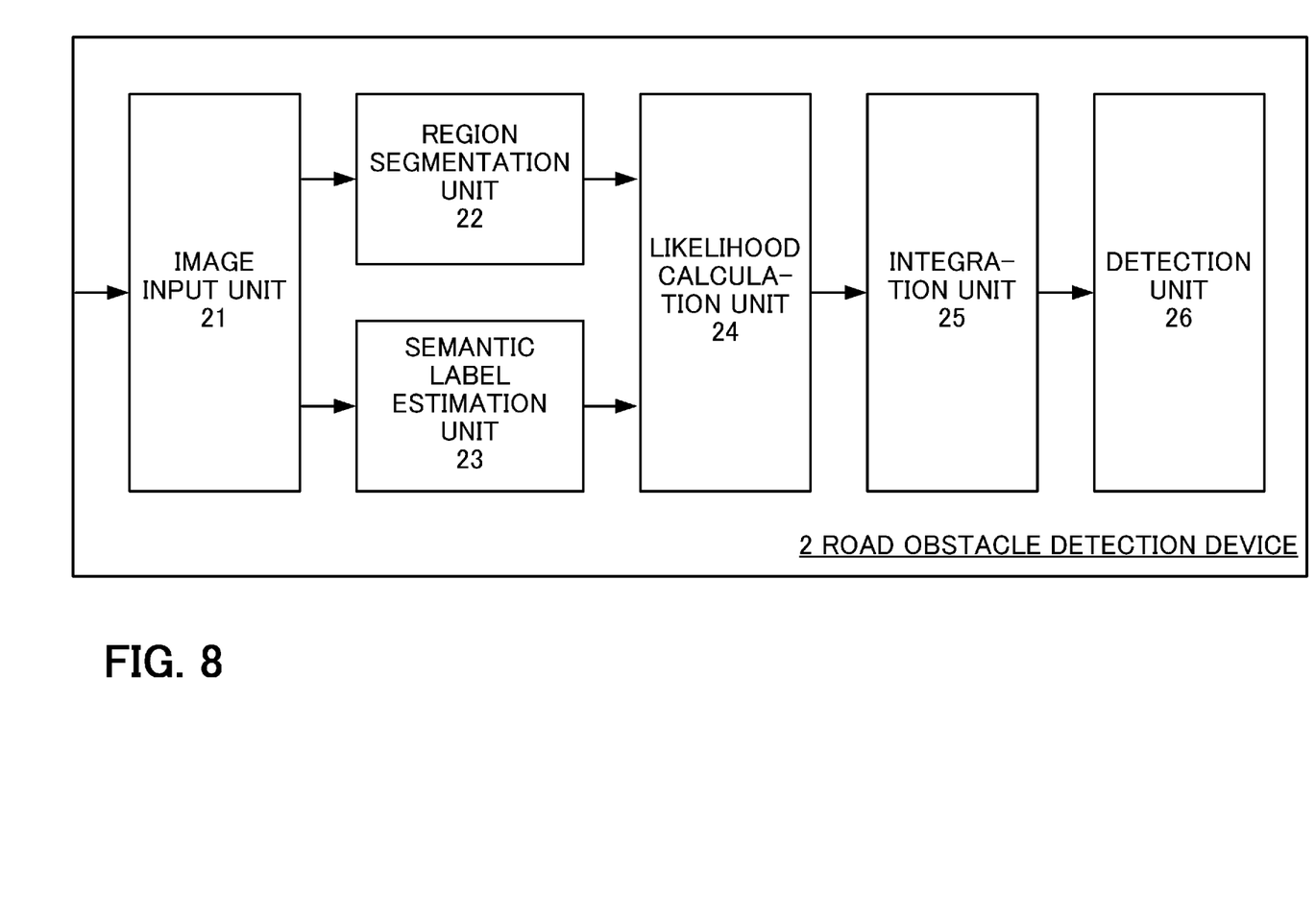
FIG. 8 is a function configuration diagram of a road obstacle detection device according to a second embodiment.

FIG. 8 is a block diagram showing the schematic configuration of a road obstacle detection device 2 according to the embodiment. Note that the embodiment will refer to only a point different from that of the first embodiment.

In the first embodiment, an obstacle likelihood in a local region obtained by applying a region segmentation algorithm is calculated, and a road obstacle is detected based on the size of the obtained obstacle likelihood. On the other hand, in the embodiment, segmentation processing for local regions is performed with a plurality of particle sizes, the same processing as that of the first embodiment is applied to respective segmentation results to calculate obstacle likelihoods, and the results with the plurality of particle sizes are integrated together to determine a final obstacle likelihood.

Figure 9:
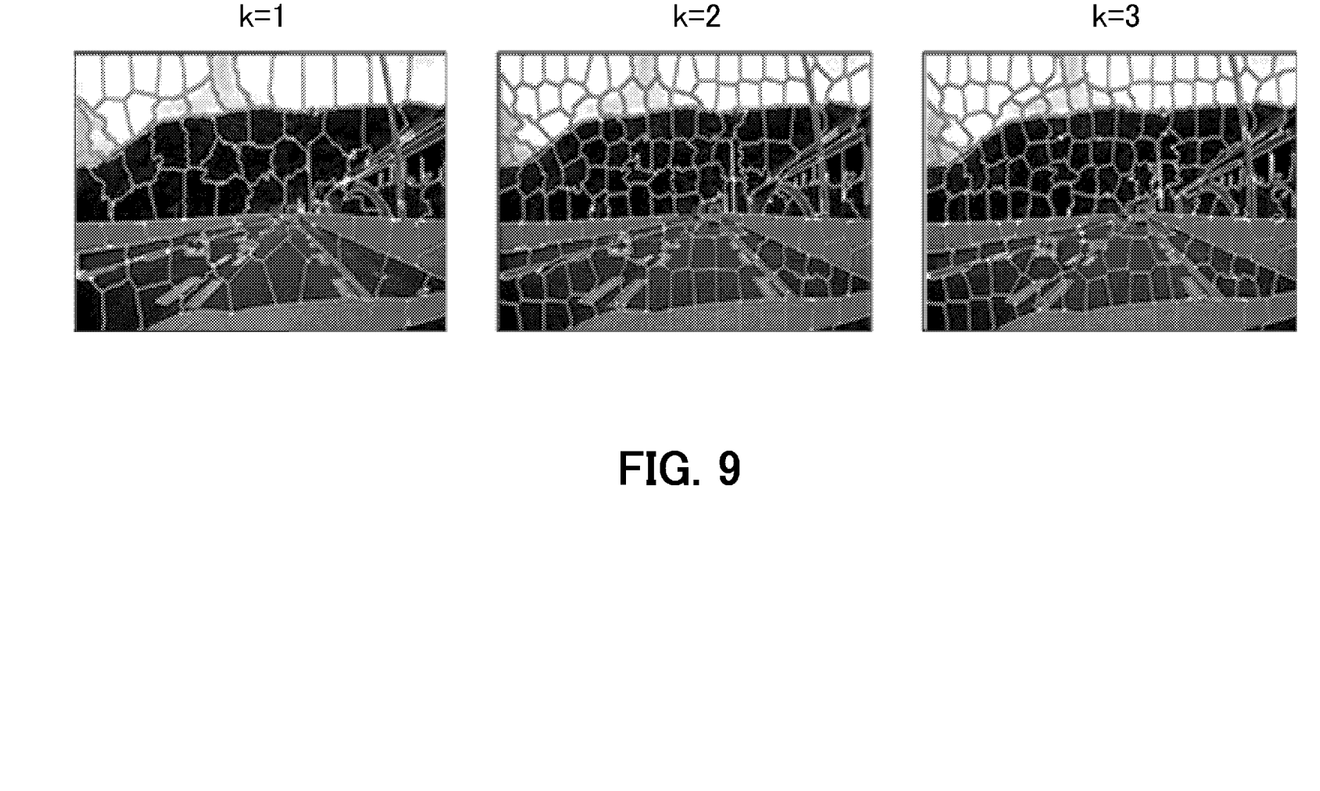
FIG. 9 is a diagram for describing region segmentation processing according to the second embodiment.

As shown in FIG. 9, a region segmentation unit 22 executes region segmentation processing on an image I(t) K times (K=3 in the example of FIG. 9) with different particle sizes. The region segmentation unit 22 segments the image I(t) into $N_k$(k=1, . . . ,K) local regions $S_{k,n}$(n=1, . . . ,$N_k$) and outputs the segmented local regions to a likelihood calculation unit 24. Here, K represents the number of particle sizes in the local regions. In addition, $N_k$ represents the number of the local regions with the k-th particle size. For example, in FIG. 9, K=3, $N_1$=100, $N_2$=150, and $N_3$=200 are provided. A segmentation processing algorithm to be applied to the local regions after the determination of the particle size $N_k$ is the same as that of the first embodiment.

A semantic label estimation unit 23 is the same as that of the first embodiment.

A likelihood calculation unit 24 calculates a road obstacle likelihood $L_{k,n}$(n=1, . . . ,$N_k$) per local region for each of the K region segmentation results. Likelihood calculation processing using one region segmentation result is the same as that of the first embodiment.

An integration unit 25 adds the obstacle likelihoods $L_{k,n}$(n=1, . . . ,$N_k$) together to calculate the sum $L_n$ (n=1, . . . ,$N_k$) of the obstacle likelihoods. The obstruction likelihood integration processing is performed for each pixel.

Figure 10:
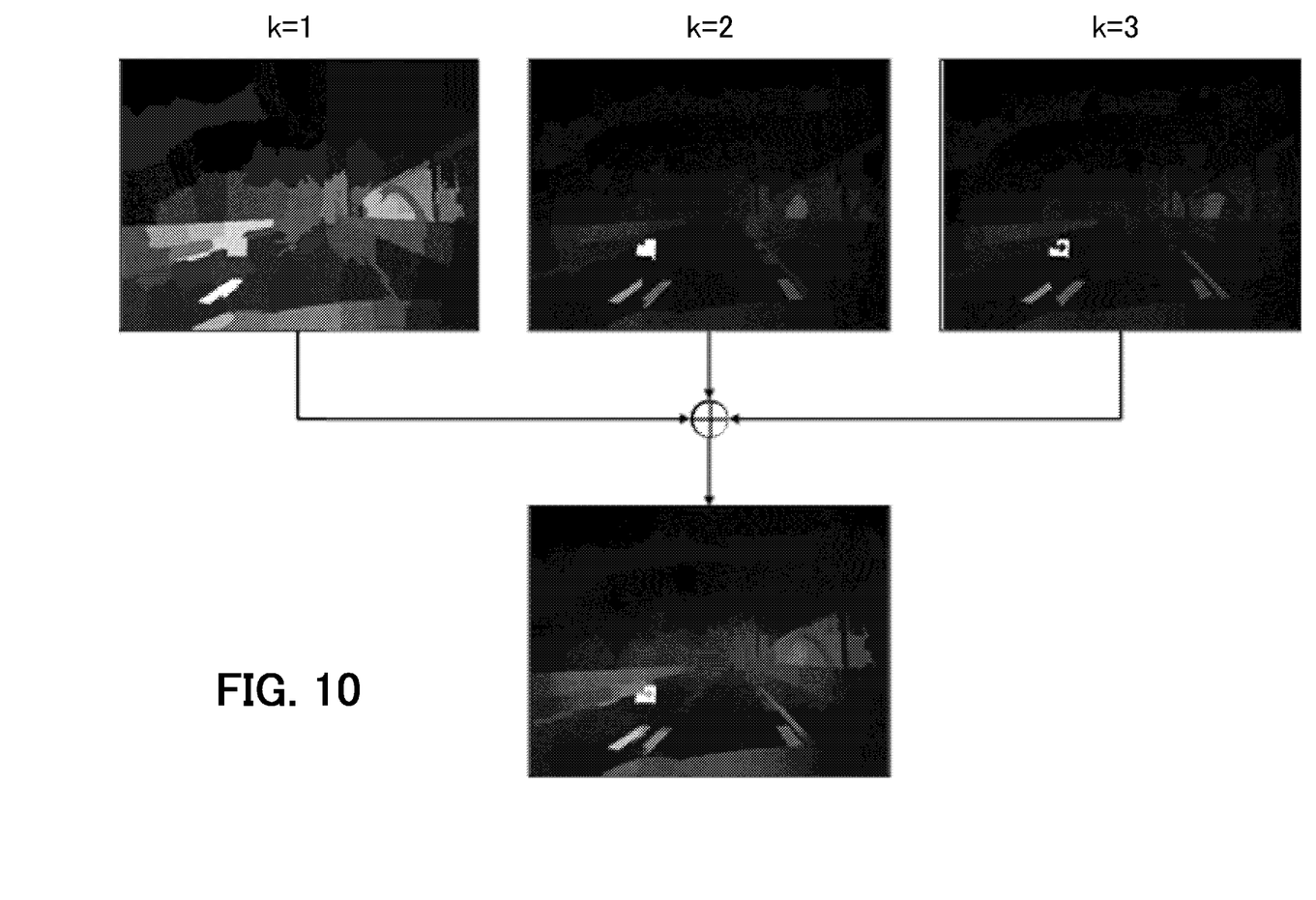
FIG. 10 is a diagram for describing road obstacle detection processing according to the second embodiment.

FIG. 10 shows the road obstacle likelihoods (upper case) calculated for the three segmentation results and the sum (lower case) of the integrated road obstacle likelihoods.

A detection unit 26 executes binarization processing and circumscribing rectangle determination processing like the first embodiment.

According to the embodiment, region segmentation results with different particle sizes are integrated together. Therefore, road obstacles may be calculated more accurately. When region segmentation is performed with a specific particle size as in the first embodiment, error detection possibly occurs depending on the sizes of road obstacles. According to the embodiment, detection is performed based on region segmentation results with a plurality of particle sizes. Therefore, even if error detection occurs based on region segmentation with one particle size, it is expected that error detection with other particle sizes does not occur. Accordingly, an improvement in detection accuracy is allowed.

Other Embodiments

The road obstacle detection devices 1 and 2 according to the present invention are not limited to those realized by mounting a semiconductor integrated circuit (LSI) but may be realized when a computer having a general-purpose microprocessor and a memory executes a program. That is, the road obstacle detection devices 1 and 2 may include a microprocessor and a non-transitory memory storing a program, and the above functions may be provided when the microprocessor executes the program. In addition, the road obstacle detection devices 1 and 2 are not necessarily mounted by one device, but the functions may be shared between a plurality of different devices and realized as a whole.

The use mode of the road obstacle detection devices according to the present invention is not particularly limited. For example, the road obstacle detection devices may be mounted on vehicles and detect road obstacles in real time in images taken by in-vehicle cameras. Alternatively, the road obstacle detection devices may be mounted on roadside apparatuses or cloud servers. In addition, the road obstacle detection processing may not be performed in real time.

In the embodiments, the probability (likelihood) of the presence of a road obstacle is subjected to the threshold processing, and a rectangle circumscribing the road obstacle is calculated and output. However, such processing is not necessarily performed. For example, a likelihood before being subjected to the threshold processing may be used as a final output.

The embodiments describe an example in which an image taken by a single lens camera is targeted. However, three-dimensional images taken by stereo cameras or time-of-flight (TOF) cameras may be targeted to detect road obstacles. Distance (depth) may be used in, for example, region segmentation processing (superpixel processing), the calculation of the distance between local regions, the calculation of the degree of a difference in appearance, or the like.

What is claimed is:

1. A road obstacle detection device that detects a road obstacle in an image, the road obstacle detection device comprising:
an image input unit configured to receive an input of an image;
a region segmentation unit configured to segment the image into a plurality of local regions; and
a likelihood calculation unit configured to calculate a probability of presence of the road obstacle in a target local region based on a probability that the target local region is not a normal object set in advance and a degree of visual saliency defined by a relationship between a surrounding local region and the target local region,
wherein the degree of the visual saliency is calculated to be larger as a probability that the surrounding local region is a road is higher and calculated to be larger as a difference in visual characteristics between the target local region and the surrounding local region is larger.

2. The road obstacle detection device according to claim 1, wherein the degree of the visual saliency is calculated to be larger as a size of the surrounding local region is larger.

3. The road obstacle detection device according to claim 1, wherein the degree of the visual saliency is calculated to be larger as a distance between the target local region and the surrounding local region is smaller.

4. The road obstacle detection device according to claim 1, wherein the likelihood calculation unit calculates the probability of the presence of the road obstacle in the target local region as a product of a sum of the degrees of the visual saliency of the plurality of local regions and the probability that the target local region is not the normal object.

5. The road obstacle detection device according to claim 1, further comprising a discrimination unit configured to learn a plurality of normal objects in advance and discriminate the plurality of normal objects,
wherein a probability that the target local region is an object other than the normal object set in advance is determined based on a discrimination result by the discrimination unit.

6. The road obstacle detection device according to claim 5,
wherein the discrimination unit discriminates the normal objects for each pixel, and
wherein the probability that the target local region is the object other than the normal object set in advance is calculated as an average of probabilities that the target local region is not the normal object, the probabilities being calculated for the pixels in the target local region.

7. The road obstacle detection device according to claim 1, wherein
the region segmentation unit segments the image with a plurality of particle sizes,
the likelihood calculation unit calculates the probability of the presence of the road obstacle in the target local region for each of segmentation results with the respective particle sizes, and
the road obstacle detection device further comprises an integration unit configured to integrate the respective probabilities together to determine the probability of the presence of the road obstacle for each pixel.

8. The road obstacle detection device according to claim 1, further comprising a detection unit configured to subject threshold processing to the probability of the presence of the road obstacle, and detect a region in the image in which the road obstacle is present based on a result of the threshold processing.

9. The road obstacle detection device according to claim 8, further comprising a display configured to display an image in which a highlighted display to highlight the region detected by the detection unit is superimposed on the input image.

10. The road obstacle detection device according to claim 1, further comprising:
a semantic label estimation unit configured to estimate semantic labels of the plurality of local regions, wherein
the likelihood calculation unit calculates a probability Li of presence of the road obstacle in a target local region $S_i$ based on an equation below $$L_i = \sum_{j=1}^{N} \{n(S_j) \cdot d_{appear}(S_i, S_j) \cdot P_{road}(S_j) \cdot W(d_{position}(S_i, S_j))\} \cdot P_{others}(S_i)$$

wherein
$S_i$ represents an i(=1 ... ,N)-th local region,
$n(S_j)$ represents a size of a local region $S_j$,
$d_{appear}(S_i,S_j)$ represents a degree of a visual difference between the local region $S_i$ and the local region $S_j$,
$P_{road}(S_j)$ represents a probability that the local region $S_j$ is a road,
$d_{position}(S_i,S_j)$ represents a distance between the local region $S_i$ and the local region $S_j$,
$W(d_{position}(S_i,S_j))$ represents a function in which a value becomes smaller as $d_{position}(S_i,S_j)$ is larger, and
$P_{others}(S_i)$ represents a likelihood that the local region $S_i$ is not a normal object.

11. A road obstacle detection method executed by a computer, the road obstacle detection method comprising:
an image input step of receiving an input of an image;
a region segmentation step of segmenting the image into a plurality of local regions; and
a likelihood calculation step of calculating a probability of presence of the road obstacle in a target local region based on a probability that the target local region is not a normal object set in advance and a degree of visual saliency defined by a relationship between a surrounding local region and the target local region, wherein
the degree of the visual saliency is calculated to be larger as a probability that the surrounding local region is a road is higher and calculated to be larger as a difference in visual characteristics between the target local region and the surrounding local region is larger.

12. The road obstacle detection method according to claim 11, wherein the degree of the visual saliency is calculated to be larger as a size of the surrounding local region is larger.

13. The road obstacle detection method according to claim 11, wherein the degree of the visual saliency is calculated to be larger as a distance between the target local region and the surrounding local region is smaller.

14. The road obstacle detection method according to claim 11, wherein in the likelihood calculation step, the probability of the presence of the road obstacle in the target local region is calculated as a product of a sum of the degrees of the visual saliency of the plurality of local regions and the probability that the target local region is not the normal object.

15. The road obstacle detection method according to claim 11, further comprising:
a discrimination step of learning a plurality of normal objects in advance and discriminating the plurality of normal objects, wherein a probability that the target local region is an object other than the normal object set in advance is determined based on a discrimination result in the discrimination step.

16. The road obstacle detection method according to claim 15, wherein
the normal objects are discriminated for each pixel in the discrimination step, and
the probability that the target local region is the object other than the normal object set in advance is calculated as an average of probabilities that the target local region is not the normal object, the probabilities being calculated for the pixels in the target local region.

17. The road obstacle detection method according to claim 11, wherein
the image is segmented with a plurality of particle sizes in the region segmentation step,
the probability of the presence of the road obstacle in the target local region is calculated for each of segmentation results with the respective particle sizes in the likelihood calculation step, and
the road obstacle detection method further comprises an integration step of integrating the respective probabilities together to determine the probability of the presence of the road obstacle for each pixel.

18. The road obstacle detection method according to claim 11, further comprising:
a detection step of subjecting threshold processing to the probability of the presence of the road obstacle, and detecting a region in the image in which the road obstacle is present based on a result of the threshold processing.

19. The road obstacle detection method according to claim 11, further comprising:
a semantic label estimation step of estimating semantic labels of the plurality of local regions, wherein
a probability Li of presence of the road obstacle in a target local region $S_i$ is calculated based on an equation below in the likelihood calculation step $$L_i = \sum_{j=1}^{N} \{n(S_j) \cdot d_{appear}(S_i, S_j) \cdot P_{road}(S_j) \cdot W(d_{position}(S_i, S_j))\} \cdot P_{others}(S_i)$$

wherein
$S_i$ represents an i(=1, ... ,N)-th local region,
$n(S_j)$ represents a size of a local region $S_j$,
$d_{appear}(S_i,S_j)$ represents a degree of a visual difference between the local region $S_i$ and the local region $S_j$,
$P_{road}(S_j)$ represents a probability that the local region $S_j$ is a road,
$d_{position}(S_i,S_j)$ represents a distance between the local region $S_i$ and the local region $S_j$,
$W(d_{position}(S_i,S_j))$ represents a function in which a value becomes smaller as $d_{position}(S_i,S_j)$ is larger, and
$P_{others}(S_i)$ represents a likelihood that the local region $S_i$ is not a normal object.

20. A non-transitory computer-readable medium storing a program for causing a computer to execute the respective steps of the road obstacle detection method according to claim 11.

21. A road obstacle detection device that detects a road obstacle in an image, the road obstacle detection device comprising:

a processor programmed to:
  receive an input of an image;
  segment the image into a plurality of local regions; and
  calculate a probability of presence of the road obstacle in a target local region based on a probability that the target local region is not a normal object set in advance and a degree of visual saliency defined by a relationship between a surrounding local region and the target local region,
wherein the degree of the visual saliency is calculated to be larger as a probability that the surrounding local region is a road is higher and calculated to be larger as a difference in visual characteristics between the target local region and the surrounding local region is larger.

\* \* \* \* \*